(12) United States Patent
Gossner et al.

(10) Patent No.: US 11,919,994 B2
(45) Date of Patent: Mar. 5, 2024

(54) POLYURETHANE FOAM MATERIALS HAVING REDUCED COLD-FLOW EFFECT AND METHOD FOR PRODUCING SAME

(71) Applicant: Covestro Intellectual Property GmbH & Co. KG, Leverkusen (DE)

(72) Inventors: Matthaeus Gossner, Cologne (DE); Peter Haas, Haan (DE); Michael Schedler, Leverkusen (DE); Sven Meyer-Ahrens, Leverkusen (DE); Lutz Brassat, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 152 days.

(21) Appl. No.: 17/601,806

(22) PCT Filed: May 7, 2020

(86) PCT No.: PCT/EP2020/062682
§ 371 (c)(1),
(2) Date: Oct. 6, 2021

(87) PCT Pub. No.: WO2020/229289
PCT Pub. Date: Nov. 19, 2020

(65) Prior Publication Data
US 2022/0204681 A1   Jun. 30, 2022

(30) Foreign Application Priority Data
May 15, 2019   (EP) .................... 19174539

(51) Int. Cl.
| C08G 18/18 | (2006.01) |
|---|---|
| C08G 18/20 | (2006.01) |
| C08G 18/22 | (2006.01) |
| C08G 18/24 | (2006.01) |
| C08G 18/32 | (2006.01) |
| C08G 18/40 | (2006.01) |
| C08G 18/48 | (2006.01) |
| C08G 18/50 | (2006.01) |
| C08G 18/64 | (2006.01) |
| C08G 18/76 | (2006.01) |
| C08J 9/12 | (2006.01) |

(52) U.S. Cl.
CPC ....... *C08G 18/6415* (2013.01); *C08G 18/222* (2013.01); *C08G 18/244* (2013.01); *C08G 18/4081* (2013.01); *C08G 18/4837* (2013.01); *C08G 18/7621* (2013.01); *C08J 9/125* (2013.01); *C08G 2110/0008* (2021.01); *C08G 2110/005* (2021.01); *C08G 2110/0058* (2021.01); *C08J 2201/022* (2013.01); *C08J 2203/10* (2013.01); *C08J 2205/06* (2013.01); *C08J 2375/08* (2013.01)

(58) Field of Classification Search
CPC .................................................. C08G 18/6415
See application file for complete search history.

(56) References Cited

U.S. PATENT DOCUMENTS

2011/0257284 A1* 10/2011 Bruchmann ......... C08G 18/632
521/137
2014/0221518 A1   8/2014 Emmrich-Smolczyk et al.

FOREIGN PATENT DOCUMENTS

CA   2273962 A1 *  6/1998

OTHER PUBLICATIONS

International Search Report for International Patent Application No. PCT/EP2020/062682, dated Oct. 19, 2020. (English translation attached).
Written Opinion for International Patent Application No. PCT/EP2020/062682, dated Oct. 19, 2020.

* cited by examiner

*Primary Examiner* — Melissa A Rioja
(74) *Attorney, Agent, or Firm* — K&L Gates LLP

(57) ABSTRACT

The invention relates to a method for producing soft polyurethane foam obtained by reacting a composition containing a component A1 containing at least one filled polyol, a component A2 containing compounds reactive with isocyanates and having a hydroxyl value of ≥20 to <100 mg KOH/g, the component A2 not containing any filled polyol, a component A3 containing water and/or at least one physical blowing agent, a component A4 containing auxiliary agents and additives, and a component B containing di- and/or polyisocyanates, characterized in that the reaction occurs in the presence of 0.5 to 3 parts by weight of an organic urea derivative as component C, which is obtained by reacting urea with a difunctional amine having a number-average molecular weight of 200 to 1000 g/mol. The invention also relates to a soft polyurethane foam obtainable by the method.

17 Claims, No Drawings

POLYURETHANE FOAM MATERIALS HAVING REDUCED COLD-FLOW EFFECT AND METHOD FOR PRODUCING SAME

CROSS REFERENCE TO RELATED APPLICATIONS

This application is a U.S. national stage application, filed under 35 U.S.C. § 371, of International Application No. PCT/EP2020/062682, which was filed on May 7, 2020, which claims priority to European Patent Application No. 19174539.7, which was filed on May 15, 2019. The contents of each are hereby incorporated by reference into this specification.

FIELD

The present invention relates to a process for producing flexible polyurethane foams, in particular HR polyurethane foams (cold foam), wherein the flexible polyurethane foam is obtained or is obtainable by reacting a composition containing an additive of a urea compound which reduces the cold flow effect, i.e. reduces the deformation of the obtained flexible polyurethane foams during storage. The invention further relates to the polyurethanes obtainable from the process and to the use thereof.

BACKGROUND

Polyurethanes may be produced inter alia as rigid foams or as flexible foams. Flexible polyurethane foams are understood as meaning polyurethane foams which offer a low resistance to compressive stress and which are open-celled, air-permeable and reversibly deformable. Flexible polyurethane foams may be produced inter alia by polymerizing the reaction mixture in a mold; these are referred to as molded foams. The reaction mixture may be cured either with or without external heating, depending on the process this is referred to as cold foam or hot foam. Cold foam is also known as high-resilient foam, or HR foam for short.

High-elasticity HR polyurethane foams have a certain proportion of undamaged cell membranes. Compared to flexible polyurethane foams high-elasticity HR foams have a higher elasticity for the same bulk density which manifests inter alia in a lower compressive strength. Production of high-elasticity HR foams typically employs filler-containing polyols and tolylene diisocyanate and also a crosslinker such as for example alkanolamines or higher-functional alcohols. The crosslinkers are required to stabilize the foam in the formation phase via a rapid reaction with TDI (Günther, Oertel; Polyurethane; 3rd edition; Chapters 5.1.1.6 and 5.1.2).

High-elasticity HR foams are of great importance in the flexible polyurethane foam industry. Mattress cores and upholstered furniture cut sections are largely produced on the basis of HR foams. This commences with production of foam blocks which are then converted as required. After foaming, the blocks are stored in block storage to ensure complete reaction. This is often accompanied by the so-called "cold flow effect" (cold flow behavior). The cold flow effect or cold flow behavior is generally to be understood as referring to bulging, deformation or a change in dimensions of a material under a constant weight at ambient temperature.

The constant weight in this case is the intrinsic weight of the foam block. The foam blocks take on a trapezoidal block geometry due to the tensile force of their intrinsic weight. This poses a serious problem in the further processing of foam since large amounts of cutting scrap are generated during foam converting, thus significantly reducing the yield during converting.

HR foams containing toluene diisocyanate (TDI) and tin 2-ethylhexanoate are particularly affected by the cold flow effect. Tin 2-ethylhexanoate is the most commonly used catalyst (crosslinking catalyst) for production of conventional HR foams. However, other catalysts such as for example dibutyltin dilaurate are also occasionally used. Organotin compounds such as dibutyltin laurate, however, are being assessed more and more critically from an ecological point of view, and various product labels meanwhile exclude their use. Dibutyltin dilaurate is therefore not an alternative to tin 2-ethylhexanoate, despite reducing the cold flow effect.

A conventional commercially available anti-cold flow additive for compositions for producing polyurethane foams, i.e. an additive for reducing deformation of polyurethane foam blocks during storage, is for example the crosslinker Ortegol 204 in combination with Kosmos 54 (a zinc salt, both from Evonik). However, a HR polyurethane foam exhibiting only a slight cold flow effect, if any, can be obtained with this conventional product only when the two components are used in a certain mixing ratio. The processing window, i.e. the possible dosages for an HR polyurethane foam in which the obtained foam has the desired properties, is consequently narrow for this technology. When conventional products are used for production of flexible polyurethane foam, especially HR flexible foams, the error tolerance in dosing is low and even a small deviation from the correct mixing ratio results in unusable flexible polyurethane foams requiring disposal or in a large amount of waste due to parts of the deformed block needing to be cut out during converting.

US 2014/0221518 A1 relates to polyurethane foams which contain pyranoses or furanoses and in which the cold flow effect is reduced compared to polyurethane foams containing a mixture of a straight-chain sugar alcohol and urea.

US 2010/0069518 discloses a process for producing polyurethane foams, in particular polyurethane foams containing filled polyols, in which no dibutyltin dilaurate is used. A process is disclosed in which a prepolymer is produced from 2-aminoethanol, a polyol and polyisocyanate in the presence of a metal salt of an organic acid, in particular the zinc salt of ricinoleic acid, as catalyst. To reduce the cold flow effect, a commercially available anti-cold flow additive, namely Ortegol 204 from Evonik, is added to the mixture. EP 0 303 105 relates to the catalysis of the production of polyurethanes. It discloses a catalyst obtained by reacting urea with heterocyclic compounds containing two amine groups in the molecular ring or with methoxypropylamine. The publication does not relate to the cold flow behavior of the polyurethanes.

There is therefore a need for flexible polyurethane foams, in particular high-elasticity HR polyurethane foams, which exhibit only a slight cold flow effect, i.e. which deform relatively little or hardly at all, when stored. There is moreover a need for anti-cold flow additives for the production of flexible polyurethane foams, in particular high-elasticity HR polyurethane foams, which can be used in various dosages without the quality of the polyurethane foam being impaired. The anti-cold flow additives must be soluble in the composition for production of the polyurethanes. In addition, the mechanical properties of the flexible polyurethane foams, in particular the high-elasticity HR polyurethane foams, shall not be adversely affected by the additive. In particular, the compressive strength should differ from polyurethane foams without an additive only slightly.

SUMMARY

It is an object of the present invention to provide a process for producing flexible polyurethane foams, in particular high-elasticity HR polyurethane foams, in which the cold flow effect, i.e. the deformation during storage of the foams, is reduced through use of an additive in the production process. In particular, a greater reduction in the cold flow effect shall be herein achieved than with conventional anti-cold flow additives. It was also of interest to ensure that the mechanical properties of the HR polyurethane foams are not impaired by the additive. In particular, the compressive strength shall remain largely unchanged compared to polyurethane foams without additive. In addition, the dosage range or the processing window in which the additive according to the invention can be used should be large, the resulting polyurethane foams each having comparable mechanical properties and a low cold flow effect, i.e. little deformation during storage. The anti-cold flow additive shall moreover be soluble in the composition for producing the polyurethanes.

This object was achieved by a process for producing flexible polyurethane foam, wherein the flexible polyurethane foam is obtained or obtainable by reaction of a composition containing or consisting of
  a component A1 containing or consisting of at least one filled polyol,
  a component A2 containing or consisting of isocyanate-reactive compounds having an OH number according to DIN 53240-1, method without catalyst, June 2013, of ≥20 to <100 mg KOH/g and wherein the component A2 contains no filled polyol,
  a component A3 containing water and/or at least one physical blowing agent,
  a component A4 containing auxiliary and additive substances and
  a component B containing or consisting of di- and/or polyisocyanates,
  wherein production is carried out at an index of 90 to 140, characterized in that
the reaction is carried out in the presence of
  0.5 to 3.0 parts by weight, based on the sum of the components A1 and A2, of an organic urea derivative as component C which is obtainable or is obtained by reaction of urea with a difunctional amine, wherein the amine has a number-average molecular weight determined according to DIN 55672-1 (March 2016), part 1, with gel permeation chromatography using polystyrene standards and tetrahydrofuran as eluent of 200 to 1000 g/mol, the amine preferably having a number-average molecular weight of 200 to 800 g/mol, more preferably of 200 to 650 g/mol, particularly preferably 400 to 650 g/mol.

It has surprisingly been found that the urea derivative according to the invention improves the cold flow behavior of polyurethane foams, in particular of polyurethane foams containing tolylene diisocyanate (TDI) and tin 2-ethylhexanoate (Desmorapid SO), i.e. the foams lose less height relative to their initial height than foams containing prior art anti-cold flow additives.

The production of isocyanate-based foams is known per se and described for example in Kunststoff-Handbuch volume VII, Polyurethane, edited by Vieweg and Höchtlein, Carl Hanser Verlag, Munich 1966, and in the new edition of this book, edited by G. Oertel, Carl Hanser Verlag Munich, Vienna 1993.

DETAILED DESCRIPTION

Component A1

Component A1 contains or consists of at least one filled polyol, wherein the filler is preferably a reaction product of di- and/or polyisocyanates with compounds having isocyanate-reactive hydrogen atoms.

Filler-containing polyols contain finely dispersed solid particles in the form of a disperse phase in a base polyol. Filler-containing polyols are conventionally produced by polymerization of styrene and acrylonitrile or by reaction of diisocyanate with diamines or amino alcohols in active or inactive base polyols. An industrially important group of filler-containing polyethers are polyurea or polyhydrazodicarboxamide polyols. They are produced by reaction of further components in situ in the polyol. As reaction components, use is made of the isocyanates and diamines or hydrazine which are joined by polyaddition to give polyureas or polyhydrazodicarboxamines. Here, partial cross-linking with the hydroxyl groups of the polyether chain takes place. The stable dispersions obtained in this way are referred to as PUD polyethers.

In a preferred embodiment component A1 contains or consists of
  A1.1 filler-containing polyol comprising a filler composition of polyurea dispersions obtainable by reaction of di- and/or polyisocyanates with di- and/or polyamines and/or hydrazines having primary and/or secondary amino groups in a polyol component (PUD polyols), and/or
  A1.2 filler-containing polyol comprising a filler composition of dispersions containing urethane groups obtainable by reaction of alkanolamines with di- and/or polyisocyanates in a polyol component (PIPA polyols) and/or
  A1.3 filler-containing polyol comprising a filler composition of solid polymers produced by free-radical polymerization of suitable monomers such as styrene or acrylonitrile in a base polymer (SAN polyols).

In a further preferred embodiment the component A1 contains no styrene-acrylonitrile-filled polyol. In another preferred embodiment component A1 contains or consists of PUD polyol. The PUD dispersion is preferably produced by reaction of an isocyanate mixture of 75% to 85% by weight of 2,4-tolylene diisocyanate (2,4-TDI) and 15 to 25% by weight of 2,6-tolylene diisocyanate (2,6-TDI) with a diamine and/or hydrazine in a polyether polyol, preferably a polyether polyol, produced by alkoxylation of a trifunctional starter (for example glycerol and/or trimethylolpropane).

PIPA polyols are polyether polyols modified with alkanolamines by polyisocyanate-polyaddition, wherein the polyether polyol preferably has a functionality of from 2.5 to 4 and a hydroxyl number of from ≥3 mg KOH/g to ≤112 mg KOH/g (molecular weight from 500 to 18 000).

The filler content of the filled polyol in component A1 is preferably not more than 40% by weight, more preferably not more than 30% by weight, yet more preferably not more than 20% by weight, in each case based on the filled polyol.

The composition for producing the flexible polyurethane foam preferably contains 35 to 85 pphp (parts per hundred parts polyol) of component A1, more preferably 40 to 80 pphp, in each case based on the sum of the polyol components A1 and A2. In a preferred embodiment the composition for producing the flexible polyurethane foam contains 75 to 85 pphp of component A1 based on the sum of the polyol components A1 and A2. In a further preferred embodiment the composition for producing the flexible polyurethane foam contains 30 to 50 pphp of component A1 based on the sum of the polyol components A1 and A2.

Component A2

Component A2 contains no filled polyol and contains or consists of isocyanate-reactive compounds having an OH number according to DIN 53240-1, method without catalyst, June 2013, of ≥20 to <100 mg KOH/g. Component A2 preferably contains compounds having at least two isocyanate-reactive hydrogen atoms. This is to be understood as meaning not only amino-containing but also thiol-containing or carboxyl-containing compounds, preferably hydroxyl-containing compounds, in particular compounds containing 2 to 8 hydroxyl groups, specifically those having an OH number according to DIN 53240-1, method without catalyst, June 2013, of ≥20 to ≤80 mg KOH/g, preferably ≥20 to ≤50 mg KOH/g, very particularly preferably ≥25 to ≤40 mg KOH/g, for example polyethers and polyesters and also polycarbonates and polyesteramides containing at least 2, generally 2 to 6, but preferably 2 to 4, hydroxyl groups, such as are known per se for the production of homogeneous polyurethanes and of cellular polyurethanes. Component A2 preferably contains or consists of a trifunctional polyether polyol having an OH number according to DIN 53240-1, method without catalyst, June 2013, ≥20 to ≤40 mg KOH/g.

For production of polyurethane foams in the cold-cure process it is preferable when at least two hydroxyl-containing polyethers having an OH number according to DIN 53240-1, method without catalyst, June 2013, of >20 to <50 mg KOH/g are employed, wherein the OH groups are composed to an extent of >80 mol % of primary OH groups (determination by $^1$H-NMR (for example Bruker DPX 400, deuterochloroform)). It is particularly preferable when the OH number according to DIN 53240-1, method without catalyst, June 2013, is >25 to <40 mg KOH/g, very particularly preferably >25 to <35 mg KOH/g.

The composition for producing the flexible polyurethane foam preferably contains 15 to 65 pphp of component A2, more preferably 20 to 60 pphp, in each case based on the sum of the polyol components A1 and A2. In a preferred embodiment the composition for producing the flexible polyurethane foam contains 15 to 25 pphp of component A2 based on the sum of the polyol components A1 and A2. In a further preferred embodiment the composition for producing the flexible polyurethane foam contains 45 to 65 pphp of component A2 based on the sum of the polyol components A1 and A2.

Component A3

Water and/or physical blowing agents are employed as component A3. Physical blowing agents employed as blowing agents include for example carbon dioxide and/or volatile organic substances. It is preferable when water is employed as component A3. The composition for producing the flexible polyurethane foam preferably contains 2 to 3 pphp of component A3 based on the sum of the polyol components A1 and A2.

Component A4

Component A4 contains auxiliary and additive substances, component A4 preferably contains
a) catalysts (activators) and/or
b) surface-active additives (surfactants), such as emulsifiers and foam stabilizers, particularly preferably a water-insoluble silicone, also known as HR silicone, for example Tegostab B8681, yet more preferably preferably component A4 contains Tegostab B8783 LF2 from Evonik, a low-emission silicone stabilizer and/or
c) additives such as reaction retardants (for example acidic substances such as hydrochloric acid or organic acid halides), cell regulators (for example paraffins or fatty alcohols or dimethylpolysiloxanes), pigments, dyes, flame retardants (for example TCPP), stabilizers against aging and weathering effects, plasticizers, fungistatic and bacteriostatic substances, fillers (for example barium sulfate, kieselguhr, carbon black or whiting) and release agents.

Component A4 preferably contains auxiliary and additive substances selected from the group consisting of diethanolamine, crosslinker for HR foams, commercially available from BASF SE or Evonik Industries tin (2-ethylhexanoate), 1,4-diazabicyclo[2.2.2]octane (TEDA) dissolved in dipropylene glycol, commercially available from Rhein Chemie Rheinau GmbH under the name ADDOCAT 105, bisdimethylaminoethyl ether "BDE", dissolved in dipropylene glycol, commercially available from Rhein Chemie Rheinau GmbH under the name ADDOCAT 108, silicone stabilizer, low-emission, commercially available from Evonik Industries, Essen, under the name TEGOSTAB B 8783 LF2 and crosslinker for HR foams, aqueous solution, contains diethanolamine, commercially available from Covestro AG under the name VP.PU PU 3266, or mixtures thereof.

Further examples of auxiliary and additive substances for optional co-use according to the invention and also details concerning ways these auxiliary and additive substances are used and function are described in Kunststoff-Handbuch, volume VII, edited by G. Oertel, Carl-Hanser-Verlag, Munich, 3rd edition, 1993, for example on pages 104-127.

The catalysts employed are preferably aliphatic tertiary amines and tin catalysts. Component A4 preferably contains one or more catalysts selected from the group consisting of tin(II) ethylhexanoate, tin(II) neodecanoate or tin(II) ricinoleate or mixtures thereof, more preferably tin(II) ethylhexanoate.

The composition for producing the flexible polyurethane foam preferably contains from 0.15 to 0.25 pphp of catalyst and 1.25 to 2.85 pphp of further non-catalyst auxiliary and additive substances according to component A4 in each case based on the sum of the polyol components A1 and A2.

Component B

Component B contains or consists of aliphatic, cycloaliphatic, araliphatic, aromatic and/or heterocyclic di- and/or polyisocyanates, for example those of formula (III)

$$Q(NCO)_n \qquad (III)$$

in which
n=2-4, preferably 2-3,
and
Q is an aliphatic hydrocarbon radical having 2-18, preferably 6-10, carbon atoms, a cycloaliphatic hydrocarbon radical having 4-15, preferably 6-13, carbon atoms or an araliphatic hydrocarbon radical having 8-15, preferably 8-13, carbon atoms.

Particular preference is generally given to the readily industrially obtainable polyisocyanates, for example 2,4- and 2,6-tolylene diisocyanate and any desired mixtures of these isomers ("TDI"); polyphenylpolymethylene polyisocyanates such as are prepared by aniline-formaldehyde condensation and subsequent phosgenation ("crude MDI"), and polyisocyanates comprising carbodiimide groups, urethane groups, allophanate groups, isocyanurate groups, urea groups or biuret groups ("modified polyisocyanates" or "prepolymers"), in particular modified polyisocyanates which derive from 2,4- and/or 2,6-tolylene diisocyanate or from 4,4'- and/or 2,4'- and/or diphenylmethane 2,2'-diisocyanate. Preferably employed as component B is at least one compound selected from the group consisting of tolylene 2,4- and 2,6-diisocyanate, diphenylmethane 4,4'- and 2,4'- and 2,2'-diisocyanate and polyphenylpolymethylene polyisocyanate ("polycyclic MDI"), particularly preferably at least one compound selected from the group consisting of diphenylmethane 4,4'- and 2,4'- and 2,2'-diisocyanate and polyphenylpolymethylene polyisocyanate ("polycyclic MDI"). The mixtures of diphenylmethane diisocyanate and polyphenylenepolymethylene polyisocyanate (pMDI) have a preferred monomer content between 50% and 100% by weight, preferably between 60% and 95% by weight, particularly preferably between 75% and 90% by weight.

In a further embodiment component B contains or consists of a mixture of 2,4- and 2,6-tolylene diisocyanate. The di- or polyisocyanates preferably have an NCO content of at least 30% by weight, preferably at least 40% by weight, particularly preferably at least 50% by weight, in each case based on the mass of the respective di- or polyisocyanate. Component B particularly preferably contains or consists of a mixture of 2,4- and 2,6-tolylene diisocyanate having an NCO content of at least 45% by weight.

The composition for producing the flexible polyurethane foam preferably contains 25 to 35 pphp of component B, more preferably 30 to 35 pphp, in each case based on the sum of the polyol components A1 and A2.

Component C

The organic urea derivative of component C is obtainable or obtained by reaction of urea with a difunctional amine, wherein the amine has a number-average molecular weight determined according to DIN 55672-1 (March 2016), part 1, with gel permeation chromatography using polystyrene standards and tetrahydrofuran as eluent of 200 to 1000 g/mol, the amine preferably having a number-average molecular weight of 200 to 800 g/mol, more preferably of 200 to 650 g/mol, particularly preferably 400 to 650 g/mol.

The difunctional amine is preferably a polyetheramine which has a backbone constructed from structural units deriving from ethylene oxide and/or propylene oxide and has two terminal amino groups. It is preferable when compounds according to the following formulae (I) or (II)

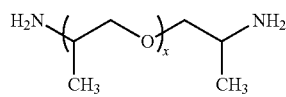

Formula (I)

where
x=5-10
or

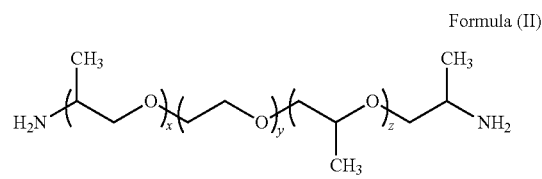

Formula (II)

where
x=1-10 and y=5-15 and z=1-10 are employed as the polyetheramine.

The organic urea derivative of the component C is preferably obtainable or obtained by reaction of a composition containing or consisting of 65 to 95 parts by weight, preferably 75 to 85 parts by weight of the difunctional amine and 35 to 5 parts by weight, preferably 25 to 15 parts by weight, of urea in each case based on the total composition.

The organic urea derivative is preferably obtained by a process comprising the steps of
providing urea and a difunctional amine to obtain a reaction mixture,
heating the reaction mixture to a temperature of 100° C. to 130° C., more preferably 115° C. to 125° C., until a maximum temperature of 130° C. to 160° C., more preferably of 140° C. to 155° C., is achieved,
after elimination of ammonia, preferably of 3 to 5 mol of ammonia, reducing the temperature to 100° C. to 120° C. and applying a vacuum.
adding water.

It is preferable when the organic urea derivative of the component C has an amine number according to DIN EN ISO 2114 (June 2002) of 0.2 to 3.0 mg KOH/g, preferably of 0.2 to 2 mg KOH/g.

It is preferable when the organic urea derivative of the component C has a dynamic viscosity according to DIN 53019-1 (September 2008), measured using a rheometer with a measuring cone with a diameter of 50 mm, angle 1° at a shear rate of 200 s$^{-1}$, of 2000 to 40 000 mPa*s, more preferably of 2500 to 39 000 mPa*s, particularly preferably 2500 to 10 000 mPa*s.

Performance of the Process for Producing Polyurethane Foams:

The reaction components are reacted by the one-step process known per se, also known as the one-shot process, the prepolymer process or the semi-prepolymer process, often using mechanical equipment. In the one-step or one-shot process, polyol, polyisocyanate and additives are dosed according to the desired composition and mixed to afford a reaction mixture. The reaction mixture is then introduced from the mixing chamber into a shaping apparatus (Kunststoff-Handbuch, Volume VII, edited by Vieweg and Höchtlen, Carl-Hanser-Verlag, Munich 1993, pp. 139 ff, 197 ff).

The process according to the invention allows a PUR foam to be produced either as a molded foam or as a slabstock foam. Slabstock polyurethane foam is converted, i.e. cut to the desired shape, after its production. Molded polyurethane foam differs from slabstock foam in terms of the manufacturing process. Molded foam is produced by reacting a reaction mixture for producing polyurethane foam in a mold, thus immediately affording a molded article.

The process for producing flexible polyurethane foam is preferably performed as a one-shot process for producing a slabstock foam. Details of preferred processing apparatuses for production of slabstock foam are described in Kunststoff-Handbuch, volume VII, edited by Vieweg and Höchtlen, Carl-Hanser-Verlag, Munich 1993, for example on pages 197ff. In another embodiment, the process for producing flexible polyurethane foam is carried out as a process for producing a molded foam. The reaction mixture may be cured either with or without external heating, depending on the process this is referred to as cold foam or hot foam. Cold foam, so-called high-resilient foam or HR foam for short, is preferred. Details of preferred processing apparatuses for production of molded foam are described in Kunststoff-Handbuch, volume VII, edited by Vieweg and Höchtlen, Carl-Hanser-Verlag, Munich 1993, for example on pages 236ff.

The process for producing flexible polyurethane foam is carried out at an index of 80 to 140, preferably of 90 to 130, more preferably of 100 to 120, particularly preferably of 105 to 115. The index (isocyanate index) indicates the percentage ratio of the actually employed isocyanate amount to the stoichiometric, i.e. calculated, amount of isocyanate groups (NCO):

index=[(isocyanate amount used):(isocyanate amount calculated)]·100

The invention further provides a flexible polyurethane foam, in particular high-elasticity HR flexible polyurethane foam, obtainable by the process according to the invention. In a further embodiment the flexible polyurethane foam is a slabstock foam. The flexible polyurethane foam preferably has an apparent density according to DIN EN ISO 845 (October 2009) of 15 to 50 kg/m³, preferably 25 to 55 kg/m³. The flexible polyurethane foam preferably has a compressive strength according to DIN EN ISO 3386-1 (October 2015), 40%, 4th compression, of 1.5 to 5.5 KPa, preferably of 2.5 to 4.5 KPa. The flexible polyurethane foam preferably has a compression set, measured according to DIN ISO 1856 (September 2016) of not more than 5%.

A further embodiment of the invention relates to the use of the thus obtained or obtainable polyurethane foam for production of furniture upholstery, textile inserts, mattresses, automotive seats, headrests, armrests, seat covers and constructional elements.

A further embodiment of the invention relates to the use of an organic urea derivative, in particular a difunctional organic urea derivative, obtainable or obtained by reaction of urea with a difunctional amine, wherein the amine has a number-average molecular weight determined according to DIN 55672-1 (March 2016), part 1, with gel permeation chromatography using polystyrene standards and tetrahydrofuran as eluent of 200 to 1000 g/mol, in a process for producing flexible polyurethane foam, especially high-elasticity HR polyurethane foam, for reducing cold flow behavior.

In a first embodiment the invention relates to a process for producing flexible polyurethane foam, wherein the flexible polyurethane foam is obtained or obtainable by reaction of a composition containing or consisting of
- a component A1 containing or consisting of at least one filled polyol,
- a component A2 containing or consisting of isocyanate-reactive compounds having an OH number according to DIN 53240-1, method without catalyst, June 2013, of ≥20 to <100 mg KOH/g and wherein the component A2 contains no filled polyol,
- a component A3 containing water and/or at least one physical blowing agent,
- a component A4 containing auxiliary and additive substances and
- a component B containing or consisting of di- and/or polyisocyanates, wherein production is carried out at an index of 90 to 140, characterized in that the reaction is carried out in the presence of 0.5 to 3.0 parts by weight, based on the sum of the components A1 and A2, of an organic urea derivative as component C which is obtainable or is obtained by reaction of urea with a difunctional amine, wherein the amine has a number-average molecular weight determined according to DIN 55672-1 (March 2016), part 1, with gel permeation chromatography using polystyrene standards and tetrahydrofuran as eluent of 200 to 1000 g/mol.

In a second embodiment the invention relates to a process according to embodiment 1, characterized in that the difunctional amine has a number-average molecular weight determined according to DIN 55672-1 (March 2016), part 1, with gel permeation chromatography using polystyrene standards and tetrahydrofuran as eluent of 200 to 800 g/mol, preferably 200 to 650 g/mol.

In a third embodiment the invention relates to a process according to embodiment 2, characterized in that the difunctional amine is a polyetheramine which has a backbone constructed from structural units deriving from ethylene oxide and/or propylene oxide and has two terminal amino groups.

In a fourth embodiment the invention relates to a process according to embodiment 3, characterized in that compounds according to the following formulae (I) or (II)

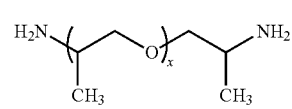

Formula (I)

where
x=5-10
or

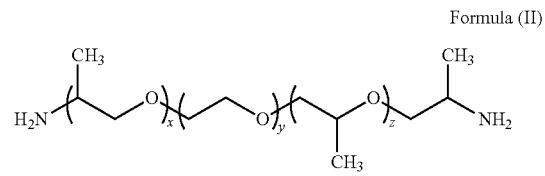

Formula (II)

where
x=1-10 and y=5-15 and z=1-10
are employed as the polyetheramine.

In a fifth embodiment the invention relates to a process according to any of the preceding embodiments, characterized in that the organic urea derivative of the component C is preferably obtainable or obtained by reaction of a composition containing or consisting of 65 to 95 parts by weight, preferably 75 to 85 parts by weight, of the difunctional amine and 35 to 5 parts by weight, preferably 25 to 15 parts by weight, of urea in each case based on the total composition.

In a sixth embodiment the invention relates to a process according to any of the preceding embodiments, characterized in that the organic urea derivative of the component C has an amine number according to DIN EN ISO 2114 (June 2002) of 0.2 to 3.0 mg KOH/g, preferably of 0.2 to 2 mg KOH/g.

In a seventh embodiment the invention relates to a process according to any of the preceding embodiments, characterized in that the organic urea derivative of the component C has a dynamic viscosity according to DIN 53019-1 (September 2008), measured using a rheometer with a measuring cone with a diameter of 50 mm, angle 1° at a shear rate of 200 s$^{-1}$, of 2000 to 40 000 mPa*s, preferably of 2500 to 39 000 mPa*s.

In an eighth embodiment the invention relates to a process according to any of the preceding embodiments, characterized in that the component B contains or consists of aromatic di- or polyisocyanates, preferably toluene-2,4-diisocyanate and/or toluene-2,6-diisocyanate.

In a ninth embodiment the invention relates to a process according to any of the preceding embodiments, characterized in that the component A4 contains one or more catalysts selected from the group consisting of tin(II) ethylhexanoate, tin(II) neodecanoate or tin(II) ricinoleate or mixtures thereof, preferably tin(II) ethylhexanoate.

In a tenth embodiment the invention relates to a process according to any of the preceding embodiments, characterized in that the component A1 contains no styrene-acrylonitrile-filled polyol.

In an eleventh embodiment the invention relates to flexible polyurethane foam, in particular high-elasticity HR flexible polyurethane foam, obtainable by a process according to any of embodiments 1 to 10.

In a twelfth embodiment the invention relates to flexible polyurethane foam according to embodiment 11, characterized in that the flexible polyurethane foam has an apparent density measured according to DIN EN ISO 845 (October 2009) of 15 to 50 kg/m³, preferably 25 to 55 kg/m³.

In a thirteenth embodiment the invention relates to flexible polyurethane foam according to either of embodiments 11 or 12, characterized in that the flexible polyurethane foam has a compressive strength according to DIN EN ISO 3386-1 (October 2015), 40%, 4th compression, of 1.5 to 5.5 kPa, preferably of 2.5 to 4.5 kPa.

In a fourteenth embodiment the invention relates to flexible polyurethane foam according to any of embodiments 11 to 13, characterized in that the flexible polyurethane foam has a compression set measured according to DIN ISO 1856 (September 2016) of not more than 5%.

In a fifteenth embodiment the invention relates to the use of a polyurethane foam according to any of embodiments 11 to 13 for production of furniture upholstery, textile inserts, mattresses, automotive seats, headrests, armrests, seat covers and constructional elements.

In a sixteenth embodiment the invention relates to the use of an organic urea derivative, in particular a difunctional organic urea derivative, obtainable or obtained by reaction of urea with a difunctional amine, wherein the amine has a number-average molecular weight determined according to DIN 55672-1 (March 2016), part 1, with gel permeation chromatography using polystyrene standards and tetrahydrofuran as eluent of 200 to 1000 g/mol, in a process for producing flexible polyurethane foam, especially high-elasticity HR polyurethane foam, for reducing cold flow behavior.

EXAMPLES

The present invention will be illustrated with the aid of the following examples, but without being restricted thereto.
Abbreviations:

A1: DESMOPHEN 7619 W, polyol containing a polyurea dispersion (PUD); filler content: 20% by wt.; OH number (according to DIN 53240-1, method without catalyst, June 2013)=28.5 mg KOH/g, A2: ARCOL POLYOL 1374, trifunctional polyether polyol, OH number (according to DIN 53240-1, method without catalyst, June 2013)=27 mg KOH/g; without filler, A4: Diethanolamine, crosslinker for HR foams, commercially available from BASF SE or Evonik Industries A4: DABCO T-9, tin (2-ethylhexanoate), commercially available from Evonik Industries A4: Desmorapid SO, Zinn-(II)-(2-ethylhexanoat)

A4: ADDOCAT 105, 1,4-diazabicyclo [2.2.2] octane, "TEDA", dissolved in dipropylene glycol, commercially available from Rhein Chemie Rheinau GmbH A4: ADDOCAT 108, bisdimethylaminoethyl ether "BDE", dissolved in dipropylene glycol, commercially available from Rhein Chemie Rheinau GmbH A4: TEGOSTAB B 8783 LF2, commercially available from Evonik Industries, Essen, silicone stabilizer, low-emission A4: Additive VP.PU PU 3266, commercially available from Covestro AG, crosslinker for HR foams, aqueous solution, contains diethanolamine B: Desmodur T 80, mixture of 2,4-TDI and 2,6-TDI, commercially available from Covestro AG, NCO content at least 48%

Reactants for Respective Anti-Cold Flow Additive:

JEFFAMINE D-400, commercially available from Huntsman Bifunctional amino-terminated polyether, wherein the polyether consists of structural units from propylene oxide, MW 430 g/mol JEFFAMINE ED-600, commercially available from Huntsman Bifunctional amino-terminated polyether, wherein the polyether consists of structural units of propylene oxide and ethylene oxide, MW 600 g/mol JEFFAMINE T-5000, commercially available from Huntsman Trifunctional amino-terminated polyether, wherein the polyether is prepared by reaction of a mixture containing propylene oxide with a triol and subsequent amination of the terminal hydroxyl groups, average MW 5000 g/mol JEFFAMINE M-600, commercially available from Huntsman Monofunctional amino-terminated polyether, wherein the polyether consists of structural units of propylene oxide and ethylene oxide, MW≈600 g/mol Diethylenetriamine Urea The reported molecular weights of the amino-terminated polyethers are in each case the number-average molecular weight determined according to DIN 55672-1 (March 2016), part 1, with gel permeation chromatography using polystyrene standards and tetrahydrofuran as eluent.

Conventional anti-cold flow additives:

ORTEGOL 204 from Evonik, crosslinker with retarded reaction profile

KOSMOS 54 from Evonik, a zinc salt

Methods of Measurement:

Dynamic Viscosity:

MCR 51 rheometer from Anton Paar according to DIN 53019-1: (September 2008) with a CP 50-1 measuring cone, diameter 50 mm, angle 1° at shear rates of 25, 100, 200 and 500 s$^{-1}$. The urea derivatives according to the invention and not according to the invention exhibit viscosity values that are independent of shear rate.

Amine number: determined according to DIN EN ISO 2114 (June 2002).

Water content: determined according to DIN 51777-1 (March 1983).

Hydroxyl number: determined according to DIN 53240-1 (process without catalyst, June 2013).

Number-average MW: determined according to DIN 55672-1 (March 2016), part 1, with gel permeation chromatography using polystyrene standards and tetrahydrofuran as eluent.

Apparent density: determined according to DIN EN ISO 845 (October 2009).

Compressive strength 40%; (4th compression): determined according to DIN EN ISO 3386-1 (October 2015).

Compression set: determined according to DIN EN ISO 1856 (September 2016).

Tensile strength: determined according to DIN EN ISO 1798 (April 2004).

Elongation at break: determined according to DIN EN ISO 1798 (April 2004).

The cold flow effect was determined at 22-25° C. and an atmospheric humidity of 40-65% RH. A foaming mold with dimensions of about 13.0 cm in height, 13 cm in width and 26.2 cm in length is lined with foil. Cardboard lids (24.4 cm×10.8 cm) are prepared. The amount of reaction mixture for the respective PUR foam is calculated such that the foam does not rise over the edge of the foaming mold. The reaction mixture is stirred and poured into the foaming mold. The cardboard lid is placed on the foam surface as soon as about 50% of the rise height of the PUR foam has been achieved and weighed down with the light cardboard lid. During the remainder of the rising process of the foam, it must be ensured that this cardboard lid remains in the middle of the package and in a horizontal position. The cardboard lid is intended to ensure that the foam has a surface that is as horizontal as possible, i.e. that the surface is not curved.

Regardless of the actual rise time of the foam, the foam is demolded to obtain a test specimen three minutes after the cream time, i.e. the filling of the foam mold. The height of the test specimen is measured (=initial height)

Altogether five minutes after commencement of the reaction the test specimen is affixed at its top and bottom such that it is prevented from falling over. The top side of the test specimen is weighed down with a 1.43 kg body (plate 93 g+wooden stamper 337 g+1 kg).

The foams are left in the above-described position, i.e. weighed down, overnight. The next day, 24 hours after weighing down, the height of the test specimen is measured again (=final height).

The height difference—expressed in %—indicates the cold flow value. The smaller the value, the poorer the cold flow behavior of the foam (for example 80% characterizes good cold flow behavior while 50% describes rather poor cold flow behavior).

The cold flow effect was calculated using the following formula:

Cold flow[%]=100×final height[cm]/initial height [cm]

Production of Anti-Cold Flow Additives

1. Production of a Difunctional Organic Urea Derivative (Anti-Cold Flow Additive ACF-1, Based on Jeffamine D-400, According to the Invention):

2.5 mol (1000 g) of Jeffamine D-400 were initially charged into a glass flask. 5.0 mol (300 g) of urea were subsequently added. Starting temperature: 24° C. The heater was then switched on and the mixture heated. At 125° C. gradual gas evolution and marked foaming were registered. The maximum achieved bottom temperature was 150° C. Once 4.3 mol of ammonia had been eliminated the temperature of the reaction mixture was reduced to 100° C. and a vacuum applied. Finally, 135 g of water were added.

The properties of the thus produced urea derivative were determined:
NH number according to DIN EN ISO 2114 (June 2002): 0.8 mg KOH/g
Water content according to DIN 51777-1 (March 1983): 10.4%
Viscosity according to DIN 53019-1: (September 2008) (25° C.): 9150 mPas 2. Production of a Difunctional Organic Urea Derivative (Anti-Cold Flow Additive ACF-2, Based on Jeffamine ED-600, According to the Invention):

1.67 mol (1000 g) of Jeffamine ED-600 were initially charged into a glass flask. 3.33 mol (200 g) of urea were subsequently added. Starting temperature: 24° C. The heater was then switched on and the mixture heated. At 117° C. gradual gas evolution and marked foaming were registered. The maximum achieved bottom temperature was 155° C. Once 3.1 mol of ammonia had been eliminated the temperature of the reaction mixture was reduced to 100° C. and a vacuum applied. Finally, 125 g of water were added.

The properties of the thus produced urea derivative were determined:
NH number according to DIN EN ISO 2114 (June 2002): 1.5 mg KOH/g
Water content according to DIN 51777-1 (March 1983): 11.5%
Viscosity according to DIN 53019-1: (September 2008) (25° C.): 2500 mPas 3. Production of a Mono-, Di- or Polyfunctional Organic Urea Derivative (Anti-Cold Flow Additive ACF-3, Based on Jeffamine T-5000, not According to the Invention):

0.40 mol (2000 g) of Jeffamine T-5000 were initially charged into a glass flask. 1.2 mol (72 g) of urea were subsequently added. Starting temperature: 24° C. The heater was then switched on and the mixture heated. At 118° C. gradual gas evolution and marked foaming were registered. The maximum achieved bottom temperature was 155° C. Once 1.1 mol of ammonia had been eliminated the reaction mixture was held at 155° C. and a vacuum applied. The product was immiscible with water and addition of water was therefore eschewed.

The properties of the thus produced urea derivative were determined:
NH number according to DIN EN ISO 2114 (June 2002): 0.2 mg KOH/g
Water content according to DIN 51777-1 (March 1983): 0.01%
Viscosity according to DIN 53019-1: (September 2008) (25° C.): 39000 mPas 4. Production of a Mono-, Di- or Polyfunctional Organic Urea Derivative (Anti-Cold Flow Additive ACF-4, Based on Diethylenetriamine, not According to the Invention):

4.5 mol (464 g) of diethylenetriamine were initially charged into a glass flask. 13.5 mol (810 g) of urea were subsequently added. Starting temperature: 24° C. The heater was then switched on and the mixture heated. At 127° C. gradual gas evolution and marked foaming were registered. The maximum achieved bottom temperature was 167° C. Once 13.5 mol of ammonia had been eliminated the temperature of the reaction mixture was reduced to 140° C. and a vacuum applied. Finally, 185 g of water were added.

The properties of the thus produced urea derivative were determined:
NH number according to DIN EN ISO 2114 (June 2002): 4.5 mg KOH/g
Water content: 15% (calculated)
Viscosity according to DIN 53019-1: (September 2008) (25° C.): 23000 mPas 5. Production of a Mono- or Difunctional Organic Urea Derivative (Anti-Cold Flow Additive ACF-5, Based on Jeffamine D-400 and p-Tolylene Isocyanate, not According to the Invention):

0.25 mol (100 g) of Jeffamine D-400 were initially charged into a glass flask. 0.50 mol (67 g) of tolylene diisocyanate were subsequently added. This caused the reaction mixture to heat up to 70-80° C. Finally, water was added until 2 phases were formed. The water phase was separated off and the organic phase diluted with the polyether Arcol® 1374 (2 parts by wt. urea derivative+1 part by wt. polyether).

The properties of the thus produced polyether-urea derivative mixture were determined:
NH number according to DIN EN ISO 2114 (June 2002): 0.4 mg KOH/g
Water content according to DIN 51777-1 (March 1983): 4.1%
Viscosity according to DIN 53019-1: (September 2008) (25° C.): 17000 mPas 6. Production of a Monofunctional Organic Urea Derivative (Anti-Cold Flow Additive ACF-6, Based on Jeffamine M-600, not According to the Invention):

1.64 mol (984 g) of Jeffamine M-600 were initially charged into a glass flask. 1.64 mol (99 g) of urea were subsequently added. Starting temperature: 24° C. The heater was then switched on and the mixture heated. At 130° C. gradual gas evolution and marked foaming were registered. The maximum achieved bottom temperature was 170° C. Once 1.64 mol of ammonia had been eliminated the temperature of the reaction mixture was reduced to 130° C. and a vacuum applied. The product was immiscible with water and addition of water was therefore eschewed.

The properties of the thus produced urea derivative were determined:
NH number according to DIN EN ISO 2114 (June 2002): 1.2 mg KOH/g
Viscosity according to DIN 53019-1: (September 2008) (25° C.): 600 mPas B Production of TDI-Based HR Polyurethane Foams Containing Additives that are According to the Invention, not According to the Invention and Conventional The HR foams were produced using the so-called "one-shot process". To this the following components were successively weighed into a paper cup having a metal bottom (raw material temperature of the components: 24° C. in each case):

polyol components A1 and A2 (DESMOPHEN 7619 W, ARCOL POLYOL 1374)

water auxiliary and additive substances silicone stabilizer (TEGOSTAB BF 8783 LF2)

crosslinker (diethanolamine)

ADDOCAT 105

ADDOCAT 108 the respective anti-cold flow additive

After weighing-in of the abovementioned components the mixture was stirred for 20 seconds with a disk stirrer (stirring speed 1200 rpm). Tin octoate (DESMORAPID SO) was then added and the mixture was stirred for a further 10 seconds (stirring speed 1200 rpm). The calculated amount of DESMODUR T 80 was then added, the stopwatch started and the reaction mixture stirred for a further 7 seconds (stirring speed 1200 rpm). The mixture was then poured into a rectangular mold lined with polyethylene film and the foaming behavior of the reaction mixture was observed.

The flexible polyurethane foams in Tables 1 and 2 all contained toluene diisocyanate (TDI) and tin 2-ethylhexanoate (Desmorapid SO). They thus contained the most common components for production of flexible polyurethane foams, especially of high-elasticity HR flexible foams, which are also the components that result in a relatively high cold flow effect, i.e. a relatively severe deformation of the flexible foams during storage.

TABLE 1

| Experiment | | According to the invention 1 | Comparative examples 2 | 3 | 4 | 5 | 6 | 7 |
|---|---|---|---|---|---|---|---|---|
| ADDITIVE | [pphp] Additive | 3 pphp ACF-1 | 0 | 0.8 pphp Ortegol 0.10 pphp Kosmos | 1.6 pphp Ortegol 0.20 pphp Kosmos | 2 pphp Ortegol 0.25 pphp Kosmos | 3 pphp Ortegol 0.50 pphp Kosmos | 3 pphp ACF-6 |
| DESMOPHEN 7619 W | [pphp] | 80 | 80 | 80 | 80 | 80 | 80 | 80 |
| ARCOL POLYOL 1374 | [pphp] | 20 | 20 | 20 | 20 | 20 | 20 | 20 |
| WATER (added) | [pphp] | 2 | 2 | 2 | 2 | 2 | 1 | 2 |
| TEGOSTAB B 8783 LF2 | [pphp] | 0.3 | 0.3 | 0.3 | 0.3 | 0.3 | 0.3 | 0.5 |
| Diethanolamine | [pphp] | 1.25 | 1.25 | 0 | 0 | 0 | 0 | 1.15 |
| ADDOCAT 105 | [pphp] | 0.1 | 0.1 | 0.1 | 0.1 | 0.1 | 0.1 | 0.1 |
| ADDOCAT 108 | [pphp] | 0.05 | 0.05 | 0.05 | 0.05 | 0.05 | 0.05 | 0.05 |
| Desmorapid SO | [pphp] | 0.18 | 0.18 | 0.21 | 0.17 | 0.16 | 0.14 | 0.20 |
| DESMODUR T 80 | [pphp] | 33.8 | 33.8 | 31.5 | 32.7 | 33.3 | 34.8 | 34.3 |
| WATER, total | [pphp] | 2.4 | 2.4 | 2.4 | 2.4 | 2.4 | 2.4 | 2.5 |
| INDEX | [—] | 110 | 110 | 110 | 110 | 110 | 110 | 109 |
| Cream time | [s] | 10 | 10 | 10 | 10 | 10 | 10 | 10 |
| Rise time | [s] | 100 | 120 | 120 | 120 | 120 | 120 | 100 |
| Cold flow effect | [%] | 87.50 | 53.00 | 78.00 | 74.00 | 72.00 | 47.00 | 53.00 |

TABLE 1-continued

|  |  | According to the invention | Comparative examples | | | | | |
|---|---|---|---|---|---|---|---|---|
| Experiment |  | 1 | 2 | 3 | 4 | 5 | 6 | 7 |
| Apparent density | [kg/m$^2$] | 41.5 | 36.2 | 43.3 | 40.2 | 39.7 | 37.9 | 37.2 |
| Compressive strength 40%; 4th compression | [kPa] | 4.26 | 3.66 | 6.95 | 5.8 | 5.48 | 4.85 | 4.05 |
| Compression set 50% | [%] | 4.8 | 3.9 | 3.3 | 3.2 | 3.6 | 5.1 | 4.2 |
| Tensile strength | [kPa] | 138 | 150 | 206 | 152 | 147 | 141 | 149 |
| Elongation at break | [%] | 160 | 161 | 148 | 133 | 137 | 127 | 154 |
| Initial height | [cm] | 16.0 | 16.0 | 9.0 | 13.5 | 14.5 | 15.0 | 16.0 |
| Final height | [cm] | 14.0 | 8.5 | 7 | 10 | 10.5 | 7 | 8.5 | pphp = parts per hundred parts polyol

Table 1 shows flexible polyurethane foams without additive (comparative example 2), polyurethane foams containing additive ACF-1 (example 1 according to the invention) and polyurethane foams containing conventional products, namely the combination of Ortegol 204 and Kosmos 54, both from Evonik (comparative example 3 to 6). In addition, comparative example 7 shows a polyurethane foam comprising a monofunctional organic urea derivative not according to the invention (ACF-6).

The experimental data show that, compared to the flexible polyurethane foams from comparative examples 3 to 7 comprising conventional cold flow additives not according to the invention, the flexible polyurethane foam from example 1 according to the invention comprising the anti-cold flow additive according to the invention exhibited the lowest deformation. The anti-cold flow additive according to the invention resulted in the greatest reduction in cold flow effect (cold flow behavior). In addition, the mechanical properties of the flexible polyurethane foam are only slightly altered by the anti-cold flow additive according to the invention, as shown especially by the comparison with the foam from comparative example 2 without anti-cold flow additive. This applies especially to compressive strength.

Comparison of the flexible polyurethane foam from example 1 according to the invention with that from comparative example 7 shows that a monofunctional urea derivative does not result in a reduction in the cold flow effect. On the contrary, the final height of the flexible polyurethane foam from comparative example 7 was just as high as that of the flexible polyurethane foam from comparative example 2 which contained no anti-cold flow additive.

The flexible polyurethane foams of comparative examples 3 to 6 contained conventional products for reducing the cold flow effect, namely the combination of Ortegol 204 and Kosmos 54, both from Evonik. At the end of the test procedure, none of these flexible polyurethane foams had a height corresponding to more than 80% of the respective starting height thereof. It is moreover apparent from comparative examples 3 to 6 that conventional anti-cold flow products counter the deformation of the foams only in a narrow dosing range, but not to the same extent as the anti-cold flow additive according to the invention. The foams of comparative examples 3 to 6 each contained a different amount of a conventional anti-cold flow additive, wherein the foam from comparative example 3 comprised the smallest amount and the foam from comparative example 6 comprised the largest amount of additive and the foam from comparative example 5 contained the manufacturer-recommended mixing ratio of the components Ortegol 204 and Kosmos 54. However, in case of even slight deviations from the recommended amount or the recommended mixing ratio, the deformation of the foams was hardly, or even negatively, affected. The foam from comparative example 5 with the manufacturer-recommended mixing ratio still exhibited a deformation of more than 20% compared to the initial height. The foams of comparative examples 3 and 6 contained less (ex. 3) or more (ex. 6) of the conventional anti-cold flow additive and even exhibited a lower final height than the foam from comparative example 2 containing no anti-cold flow additive whatsoever. Moreover, in particular the compressive strength of the flexible polyurethane foams of comparative examples 3 to 6 were affected compared to comparative example 2 (without anti-cold flow additive); the foams were harder.

At a comparable amount of anti-cold flow the ant-cold flow additive according to the invention achieved much improved cold flow behavior, as shown by the comparison of example 1 according to the invention with comparative example 6. At the same time, at an identical amount of additive the anti-cold flow additive according to the invention has a smaller effect on breaking elongation than the conventional anti-cold flow additive.

TABLE 2

|  |  | According to the invention | | | Comparative | | | |
|---|---|---|---|---|---|---|---|---|
| Experiment |  | 8 | 9 | 10 | 11 | 12 | 13 | 14 |
| ADDITIVE | [pphp] | 1 pphp ACF-1 | 2 pphp ACF-1 | 3 pphp ACF-2 | 0 | 3 pphp ACF-3 | 3 pphp ACF-4 | 3 pphp ACF-5 |
| DESMOPHEN 7619 W | [pphp] | 45 | 45 | 45 | 45 | 45 | 45 | 45 |
| ARCOL POLYOL 1374 | [pphp] | 55 | 55 | 55 | 55 | 55 | 55 | 55 |

TABLE 2-continued

|  |  | According to the invention | | | Comparative | | | |
| --- | --- | --- | --- | --- | --- | --- | --- | --- |
| Experiment |  | 8 | 9 | 10 | 11 | 12 | 13 | 14 |
| WATER (added) | [pphp] | 1.38 | 1.38 | 1.38 | 1.38 | 1.08 | 1.13 | 1.45 |
| TEGOSTAB B 8783 LF2 | [pphp] | 0.35 | 0.35 | 0.35 | 0.35 | 0.35 | 0.35 | 0.35 |
| ADDITIVE VP.PU PU 3266 | [pphp] | 2.00 | 2.00 | 2 | 2 | 3 | 2 | 2 |
| ADDOCAT 105 | [pphp] | 0.10 | 0.10 | 0.10 | 0.10 | 0.14 | 0.10 | 0.10 |
| ADDOCAT 108 | [pphp] | 0.05 | 0.05 | 0.05 | 0.05 | 0.05 | 0.05 | 0.05 |
| DABCO T-9 | [pphp] | 0.22 | 0.22 | 0.22 | 0.22 | 0.22 | 0.23 | 0.23 |
| DESMODUR T 80 | [pphp] | 32.3 | 32.3 | 32.3 | 32.3 | 34.4 | 34.4 | 34.5 |
| WATER, total | [pphp] | 2.20 | 2.20 | 2.20 | 2.20 | 2.20 | 2.40 | 2.40 |
| INDEX | [—] | 110 | 110 | 110 | 110 | 110 | 110 | 110 |
| Cream time | [s] | — | — | 11 | 10 | 10 | 10 | 10 |
| Rise time | [s] | — | — | 110 | 105 | 120 | 105 | 105 |
| Cold flow effect | [%] | 60 | 72 | 81 | 50 | 27 | 39 | 33 |
| Apparent density | [kg/m$^2$] | 45.3 | 42.3 | 38.2 | 40.9 | 44.3 | 37.5 | 39.0 |
| Compressive strength 40%; 4th compression | [kPa] | 4.31 | 3.65 | 2.77 | 3.45 | 4.37 | 3.65 | 3.82 |
| Compression set 50% | [%] | 4.4 | 4.8 | 3.2 | 3.8 | 7.2 | 4 | 5 |
| Tensile strength | [kPa] | 97 | 102 | 108 | 116 | 122 | 124 | 107 |
| Elongation at break | [%] | 140 | 159 | 154 | 144 | 121 | 153 | 137 |
| Initial height | [cm] | 15.0 | 16.0 | 15.5 | 15.0 | 15.0 | 16.5 | 15.0 |
| Final height | [cm] | 9.0 | 11.5 | 12.5 | 7.5 | 4.0 | 6.5 | 5.0 |

The amounts reported in pphp are in each case based on the sum of the polyol components.

Examples 8 to 10 according to the invention show that the anti-cold flow additive according to the invention may be employed in different amounts. Even at a small amount of 1 pphp based on the polyol component, the cold flow effect was markedly lower than for the polyurethane foam without an anti-cold flow additive from comparative example 11.

The polyurethane foams of example 10 according to the invention and of comparative examples 12 to 14 each contained the same amount of an anti-cold flow additive and elucidate that the reduction in cold flow effect depends on the structure of the additive. It is apparent from comparative examples 12 and 13 that additives based on a trifunctional amine do not reduce the cold flow effect compared to a polyurethane foam without anti-cold flow additive. Comparative example 14 further shows that the reaction of a difunctional amine which has a backbone constructed from structural units deriving from ethylene oxide and/or propylene oxide and has two terminal amino groups with TDI does not result in reduction of cold flow.

The experimental data show that the use of the anti-cold flow additive according to the invention significantly reduced the cold flow effect in flexible polyurethane foams. This manifests in the higher % values of the cold flow effect. The higher the % values of the cold flow effect, the lower (better) the cold flow of the flexible polyurethane foam, i.e. the less it changes its shape/the better the flexible foam retains its original shape.

Further Anti-Cold Flow Additives not According to the Invention

An anti-cold flow additive was produced from urea and a bifunctional amine having a number-average molecular weight of 4000 g/mol (Jeffamine D4000). The use of these urea derivatives (based on Jeffamine D4000) in the production of a polyurethane foam led to complete collapse of the foam at all tested usage amounts, i.e. no flexible polyurethane foam was obtained.

Urea derivatives based on diamines having a molecular weight <200 g/mol are solids which cannot be employed due to a lack of solubility in the composition for producing a flexible polyurethane foam.

The examples show that the molecular weight of the difunctional amines also plays a decisive role since outside the range from 200 to 1000 g/mol no polyurethane foams are obtainable or the additive cannot be employed.

What is claimed is:

1. A process for producing flexible polyurethane foam, the process comprising reacting a composition to obtain the flexible polyurethane foam, the composition comprising:
    a component A1 containing at least one filled polyol,
    a component A2 containing isocyanate-reactive compounds having an OH number according to DIN 53240-1, method without catalyst, June 2013, of ≥20 to <100 mg KOH/g and wherein the component A2 contains no filled polyol,
    a component A3 containing water and/or at least one physical blowing agent,
    a component A4 containing auxiliary and additive substances and
    a component B containing di- and/or polyisocyanates,
    wherein production is carried out at an index of 90 to 140, and wherein the reaction is carried out in the presence of 0.5 to 3.0 parts by weight, based on the sum of the components A1 and A2, of an organic urea derivative as component C which is obtained by reaction of urea with a difunctional amine, wherein the difunctional amine has a number-average molecular weight determined according to DIN 55672-1 March 2016, part 1, with gel permeation chromatography using polystyrene standards and tetrahydrofuran as eluent of 200 to 1000 g/mol.

2. The process as claimed in claim 1, wherein the difunctional amine has a number-average molecular weight determined according to DIN 55672-1 March 2016, part 1, with gel permeation chromatography using polystyrene standards and tetrahydrofuran as eluent of 200 to 800 g/mol.

3. The process as claimed in claim 2, wherein the difunctional amine is a polyetheramine which has a backbone constructed from structural units deriving from ethylene oxide and/or propylene oxide and has two terminal amino groups.

4. The process as claimed in claim 3, wherein at least one compound according to the following formulae (I) or (II)

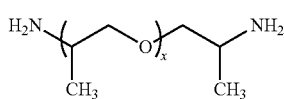

Formula (I)

where
x=5-10

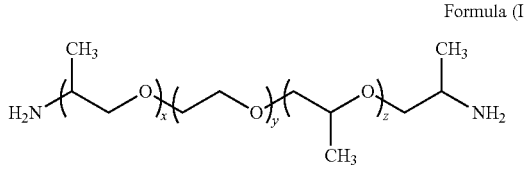

Formula (II)

where
x=1-10 and y=5-15 and z=1-10
are employed as the polyetheramine.

5. The process as claimed in claim 1, wherein the organic urea derivative of the component C is obtained by reaction of a composition containing 65 to 95 parts by weight of the difunctional amine and 35 to 5 parts by weight of urea in each case based on the total composition.

6. The process as claimed in claim 1, wherein the organic urea derivative of the component C has an amine number according to DIN EN ISO 2114 June 2002 of 0.2 to 3.0 mg KOH/g.

7. The process as claimed in claim 1, wherein the organic urea derivative of the component C has a dynamic viscosity according to DIN 53019-1 September 2008, measured using a rheometer with a measuring cone with a diameter of 50 mm, angle 1° at a shear rate of 200 $s^{-1}$, of 2000 to 40 000 mPa*s.

8. The process as claimed in claim 1, wherein the component B contains aromatic di- or polyisocyanates.

9. The process as claimed in claim 1, wherein the component A4 contains one or more catalysts selected from the group consisting of tin(II) ethylhexanoate, tin(II) neodecanoate or tin(II) ricinoleate or mixtures thereof.

10. A flexible polyurethane foam obtainable by a process as claimed in claim 1.

11. The flexible polyurethane foam as claimed in claim 10, wherein the flexible polyurethane foam has an apparent density measured according to DIN EN ISO 845 October 2009 of 15 to 50 kg/m$^3$.

12. The flexible polyurethane foam as claimed in claim 10, wherein the flexible polyurethane foam has a compressive strength according to DIN EN ISO 3386-1 October 2015, 40%, 4th compression, of 1.5 to 5.5 kPa.

13. The flexible polyurethane foam as claimed in claim 10, wherein the flexible polyurethane foam has a compression set measured according to DIN ISO 1856 September 2016 of not more than 5%.

14. A method comprising producing furniture upholstery, textile inserts, mattresses, automotive seats, headrests, armrests, seat covers and/or constructional elements with the flexible polyurethane foam as claimed in claim 10.

15. The process as claimed in claim 2, wherein the difunctional amine has a number-average molecular weight determined according to DIN 55672-1 March 2016, part 1, with gel permeation chromatography using polystyrene standards and tetrahydrofuran as eluent of 200 to 650 g/mol.

16. The process as claimed in claim 8, wherein the component B contains toluene-2,4-diisocyanate and/or toluene-2,6-diisocyanate.

17. The process as claimed in claim 9, wherein the component A4 contains tin(II) ethylhexanoate.

* * * * *